(12) United States Patent
Yamada

(10) Patent No.: US 6,543,849 B1
(45) Date of Patent: Apr. 8, 2003

(54) RECLINING ANGLE ADJUSTMENT SYSTEM

(75) Inventor: Yukifumi Yamada, Toyota (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 30 days.

(21) Appl. No.: 09/698,197

(22) Filed: Oct. 30, 2000

(30) Foreign Application Priority Data

Oct. 29, 1999 (JP) .......................................... 11-310224

(51) Int. Cl.⁷ ................................................ B60N 2/20
(52) U.S. Cl. ....................................... 297/363; 297/367
(58) Field of Search ................................ 297/366, 367, 297/363

(56) References Cited

U.S. PATENT DOCUMENTS

| | | | | |
|---|---|---|---|---|
| 4,541,672 A | | 9/1985 | Fukuta et al. ................ 297/367 |
| 5,553,922 A | * | 9/1996 | Yamada et al. ......... 297/367 X |
| 5,622,408 A | * | 4/1997 | Yamada et al. ............. 297/367 |
| 5,816,656 A | * | 10/1998 | Hoshihara .................... 297/367 |
| 6,095,608 A | * | 8/2000 | Ganot et al. ................. 297/367 |
| 6,260,923 B1 | * | 7/2001 | Yamada et al. ......... 297/367 X |

* cited by examiner

Primary Examiner—Peter M. Cuomo
Assistant Examiner—Rodney B. White
(74) Attorney, Agent, or Firm—Burns, Doane, Swecker & Mathis, LLP

(57) ABSTRACT

A reclining angle adjustment mechanism which is capable of adjusting a reclining angle of a seat-back relative to a seat-cushion in a seat includes a pair of seat reclining devices provided at either side of the seat which are connected by way of a connecting shaft. The connecting shaft is operatively connected to an operating mechanism to which an operation force is applied to permit the seat back to be adjusted relative to the seat cushion.

16 Claims, 5 Drawing Sheets

RECLINING ANGLE ADJUSTMENT SYSTEM

This application is based on and claims priority under 35 U.S.C. §119 with respect to Japanese Application No. 11(1999)-310224 filed on Oct. 29, 2000, the entire content of which is incorporated herein by reference.

FIELD OF THE INVENTION

The present invention is generally directed to a vehicle seat. More particularly, the present invention pertains to a reclining angle adjustment system having a pair of seat reclining devices provided at laterally opposite sides of a vehicle seat for adjusting the reclining angle of the seat-back relative to the seat-cushion.

BACKGROUND OF THE INVENTION

One type of reclining angle adjustment system for a vehicle seat is disclosed in U.S. Pat. No. 4,541,672 granted to Fukuta et al. This reclining angle adjustment system includes a pair of seat reclining devices provided at laterally opposite sides of a seat and a connecting mechanism that operatively connects the devices. The connecting mechanism is designed to include an amount of play to prevent one of the reclining devices from being half-locked due to mutual interference between the reclining devices when the other of the reclining devices is in the locked condition. On the other hand, this play in the connecting mechanism may cause a problem in that when the other reclining device is released by manipulating an operation lever, the resulting releasing movement of one of the reclining devices becomes delayed or, in a worst case scenario, a malfunction occurs. To avoid such a serious problem, the known reclining angle adjustment system is constructed so that the lock release mechanism of the reclining device at the driven side is structured to release the locked condition by less of an amount of operation which compensates for the play and so both of the reclining devices are made to be substantially simultaneously in the releasing locked condition.

However, with the known reclining angle adjustment system described above, both of the lock releasing mechanisms are unsymmetrical in the lateral direction, which results in the adjustment of the reclining angle being limited to operate at one side of the seat. Thus, a need exists for reclining angle adjustment system that makes it possible to adjust the reclining angle of the seat-back from either side of the seat, especially with bench type seats or seats having a relatively long lateral dimension.

SUMMARY OF THE INVENTION

One aspect of the present invention involves a seat reclining angle adjustment mechanism that includes a pair of seat reclining devices provided at laterally opposite sides of a seat device having a seat cushion member and a seat back member, with each of the seat reclining devices having a lock mechanism which locks the seat back member in a position relative to the seat cushion member and upon release allows the seat back member to be tilted in different angular positions with respect to the seat cushion member. A connecting shaft connects the lock mechanism of each of the seat reclining devices in a mutually operative manner, and an operating mechanism is connected to the connecting shaft for effecting operation of the lock mechanisms.

According to another aspect of the invention, a seat reclining angle adjustment device includes a pair of seat reclining devices provided at laterally opposite sides of a seat having a seat cushion member and a seat back member, with each of the seat reclining devices including a lock mechanism which locks the seat back member in position relative to the seat cushion member and upon release allows the seat back member to be tilted in different angular positions with respect to the seat cushion member. A connecting shaft connects the lock mechanism of both seat reclining devices in a mutually operative manner, and a pair of operating levers are positioned at opposite sides of the seat. A pair of connecting rods are provided, each of which is connected to the connecting shaft and to one of the operating levers for transmitting operating movement of either one of the operating levers to the connecting shaft to effect a release of the locking mechanism of both seat reclining devices.

In accordance with a further aspect of the present invention, a vehicle seat reclining angle adjustment device includes a pair of seat reclining devices adapted to be positioned at laterally opposite sides of a vehicle seat having a seat cushion member and a seat back member, with each of the seat reclining devices including an upper arm adapted to be connected to the seat back member, a lower arm adapted to be connected to the seat cushion member, a shaft member on which the upper and lower arms are rotatably supported and a lock mechanism which locks the upper and lower arms in position relative to each other and upon release allows the upper arm to be tilted in different angular positions with respect to the lower arm. A rotatable connecting shaft is connected to each of the shaft members by engaging elements provided on both the connecting shaft and the shaft members so that rotation of the connecting shaft causes rotation of the shaft members to effect release of the lock mechanisms. An operating lever is positioned at one side of the seat and is operatively connected to the connecting shaft so that operation of the operating lever causes rotation of the connecting shaft which in turn causes rotation of the shaft members to effect release of the lock mechanism.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein.

DETAILED DESCRIPTION OF THE INVENTION

Figure 1:
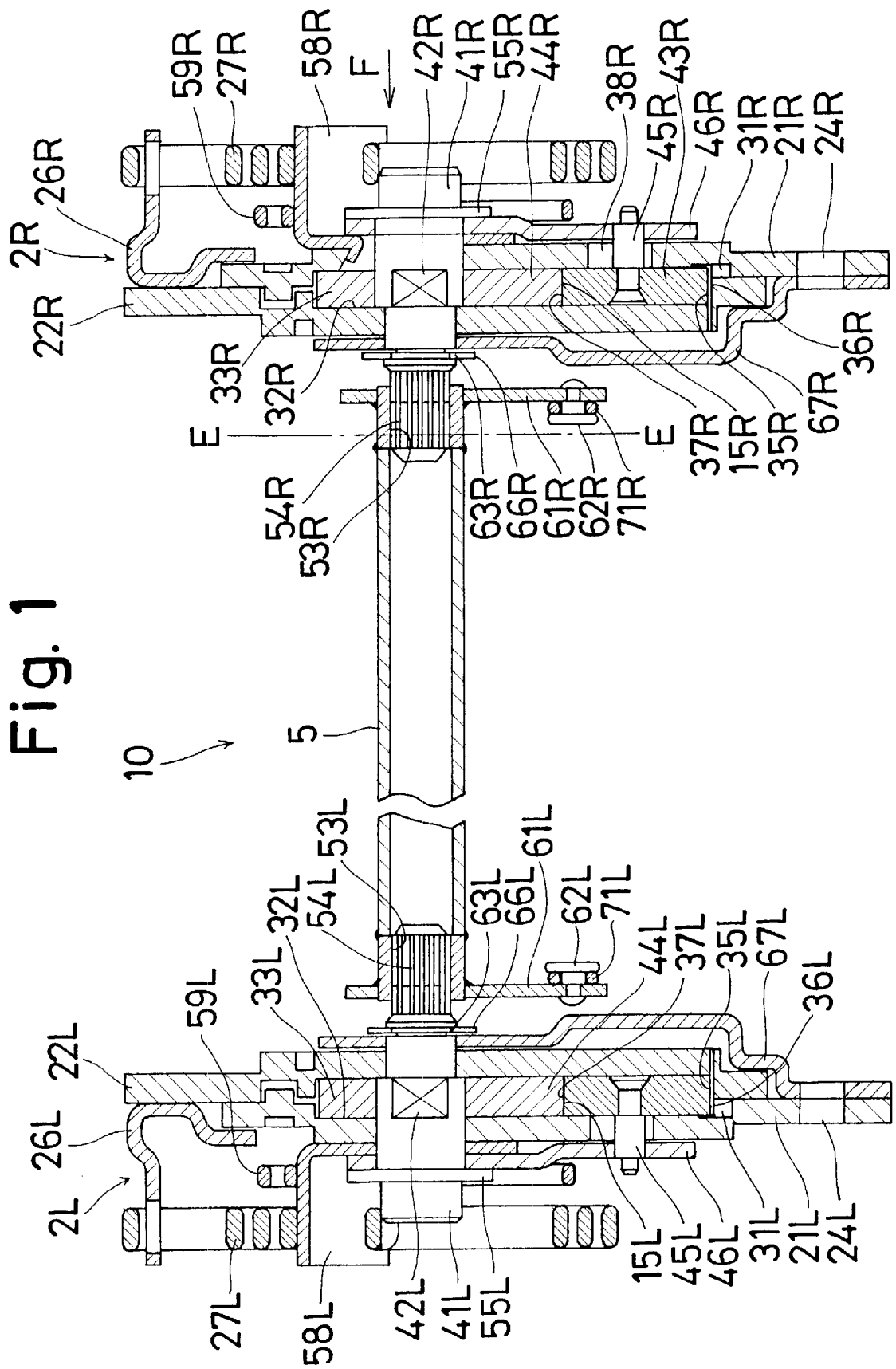
FIG. 1 is a vertical cross-sectional view of an embodiment of a reclining angle adjustment system in accordance with the present invention.
Figure 5:
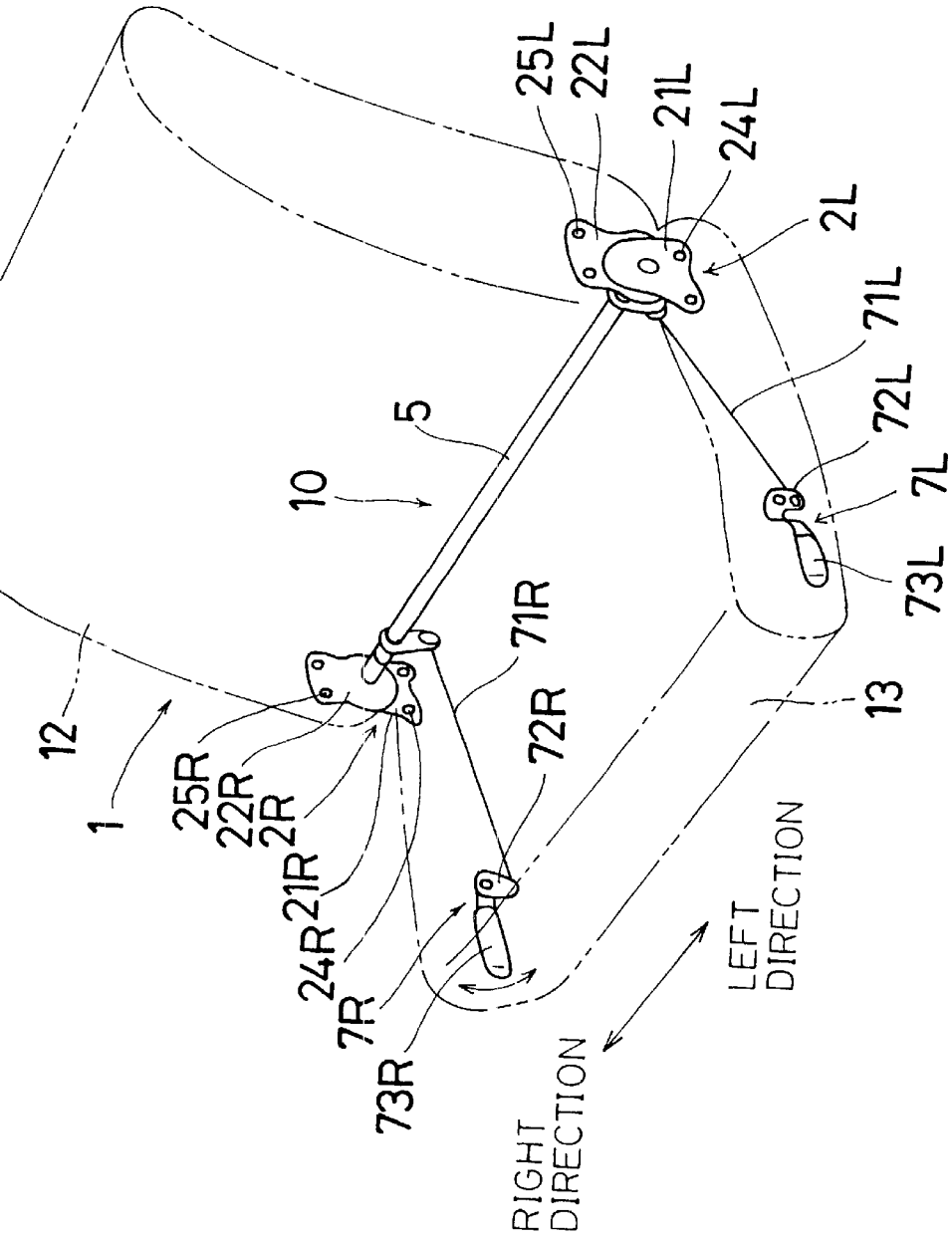
FIG. 5 is a perspective view of the reclining angle adjustment system illustrated in FIG. 1.

Referring initially to FIGS. 1 and 5, the reclining angle adjustment system 10 for a vehicle in accordance with the present invention includes a pair of seat reclining devices 2R, 2L that are positioned to the lateral right and left sides of a seat device 1, respectively. The seat reclining devices 2R, 2L are adapted to make the seat-back 12 tiltable with respect to the seat-cushion 13. It is to be noted in the following description that the parts, elements, devices, and/or mechanisms on the right side are designated with the suffix "R" while the parts, elements, devices, and/or mechanisms on the left side are designated with the suffix "L".

The reclining angle adjustment system 10 also includes a connecting shaft 5 which establishes cooperation between the seat reclining devices 2R, 2L for effecting simultaneous locking and unlocking operation. Moreover, the system 10 includes operation lever units 7R, 7L through which an operating force is transmitted to the connecting shaft 5.

The seat reclining device 2R (2L) includes a lower arm 21R (21L) and an upper arm 22R (22L). The lower arm 21R (21L) is secured to the right-side of the seat-cushion frame forming a part of the seat-cushion member (left-side of the seat-cushion frame forming a part of the seat-cushion member), which is not specifically shown, via a pair of bolts passing through holes 24R (24L) formed in the lower arm 21R (21L). The upper arm 22R (22L) is secured to the right-side of the seat back frame forming a part of the seat back member (left-side of the seat-back frame forming a part of the seat back member), which is not specifically shown, via a pair of bolts passing through holes 25R (25L) formed in the upper arm 22R (22L).

Figure 2:
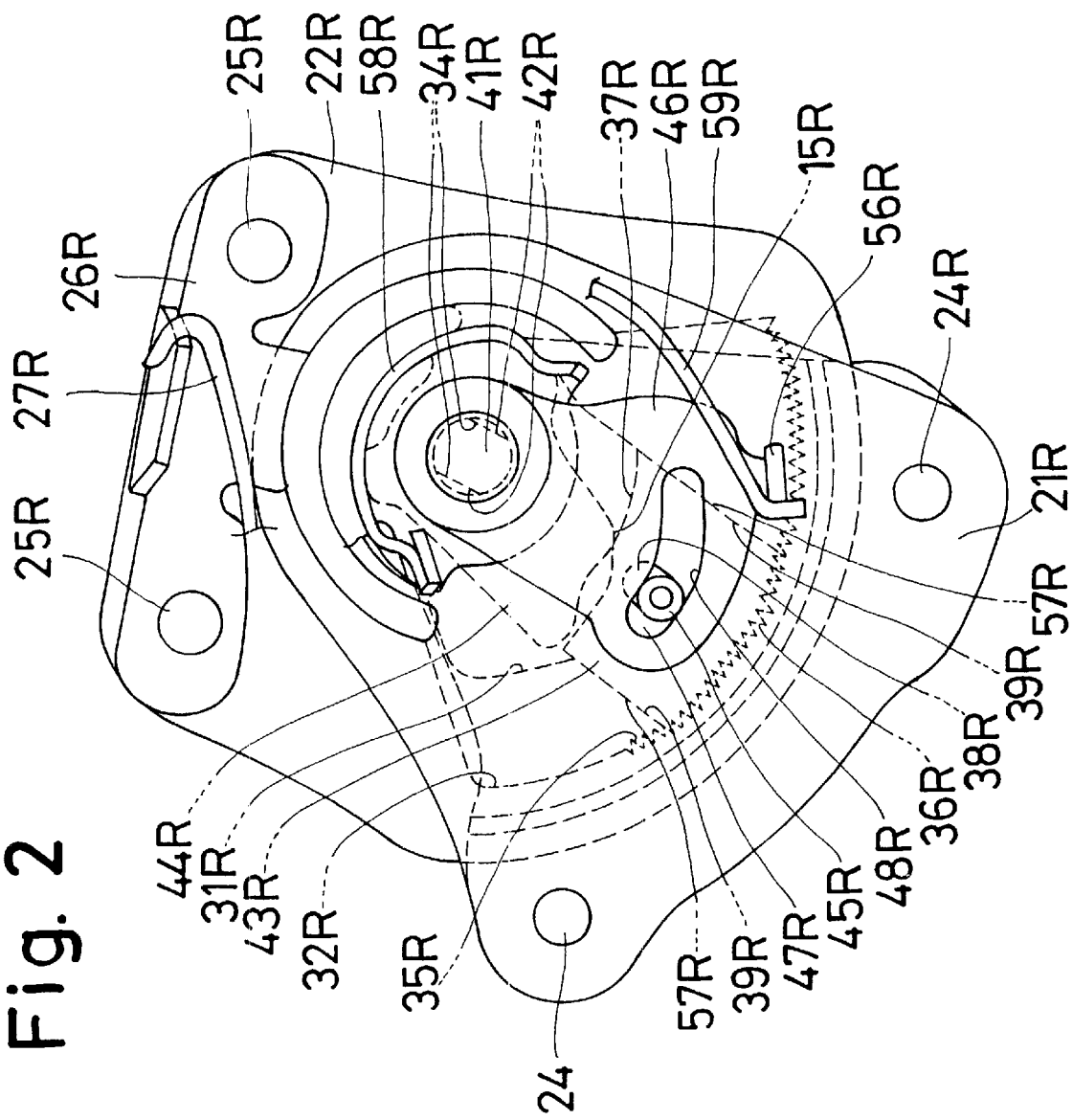
FIG. 2 is a side view of the reclining angle adjustment system shown In FIG. 1 as seen from the direction "F" in FIG. 1.

As can be seen from FIGS. 1 and 2, the lower arm 21R (21L) is formed with a concavity or recessed portion 31R (31L) which is in the form of a semi-punched configuration and which opens toward the upper arm 22R (22L). On the other hand, the upper arm 22R (22L) is formed with a concavity or recessed portion 32R (32L) which is in the form of a semi-punched configuration and which opens toward the lower arm 22R (22L). Thus, the recessed portion 31R (31L) on the lower arm and the opposing recessed portion 32R (32L) on the upper arm define a space 33R (33L) in which is accommodated a pawl 43R (43L) and cam lever 44R (44L).

A shaft 41R (41L) passes through the upper arm 22R (22L), the lower arm 21R (21L), and the cam lever 44R (lever 44L) so that both of the upper and lower arms 22R, 21R and both of the upper and lower arms 22L, 21L are rotatable relative to the shaft 41R. The cam lever 44R is prevented from being rotated relative to the shaft 41R by virtue of a pair of parallel inside planes or inwardly facing planar surfaces 34R, 34R provided on the cam lever 44R that engage respective outside planes or outwardly facing planar surfaces 42R, 42R of the shaft 41R. Rotational movement of the cam lever 44L relative to the shaft 41L is prevented in a similar manner.

An inner gear portion 35R (35L) is provided along a portion of the arc-shaped inner periphery of the recess 32R (32L) at a predetermined distance from the axis of the shaft 41R (41L). The pawl 43R (43L) possesses a thickness which allows the pawl to move in the space 33R (33L). The pawl 43R (43L) is rectangular in shape and is provided with an outer gear portion 36R (36L) on one side. The outer gear portion 36R (36L) meshes with the inner gear portion 35R (35L) of the upper arm 22R (22L). At the side of the pawl 43R (43L) opposite the outer gear portion 36R (36L), the pawl 43R (43L) is formed with a cam surface 37R (37L). This cam surface 37R (37L) is adapted to be engaged by a head end 15R (15L) of the cam lever 44R (44L) for urging the pawl 43R (43L) so that the outer gear portion 36R (36L) engages the inner gear portion 35R (35L).

The pawl cam surface 37R (37L) is in the form of a tapered structure to increase the urging amount of the cam lever 44R (44L) towards the pawl 43R (43L) in accordance with the advancement of the cam lever 44R (44L) in the locking direction (i.e., in the counterclockwise direction in FIG. 2). The other two outer peripheries 57R, 57R of the pawl 43R are generally parallel with each other to make it possible to move or slide the pawl 43R in the direction causing engagement between the gear portions 36R, 35R.

The pawl 43R (43L) is driven or moved together with a pin 45R (45L) which extends toward the lower arm 21R (21L). A longitudinal slot 38R (38L) is formed in the lower arm 21R (21L) and extends in the radial direction with respect to the axis of the shaft 41R (41L). The pin 45R (45L) passes through the longitudinal slot 38R (38L). In addition, at the side of the lower arm 21R (21L) that is opposite the upper arm 22R (22L), the lower arm 21R (21L) is provided with a release arm 46R (46L). The release arm 46R (46L) is secured to the shaft 41R (41L) by a suitable connection mechanism such as welding.

A bracket 58R (58L) is mounted on the shaft 41R (41L) and is secured to the lower arm 21R (21L) in a sandwiched fashion between the lower arm 21R (21L) and the release arm 46R (46L). A hook portion 56R (56L) extending towards the bracket 58R (58L) is integrally formed at the peripheral portion of the release arm 46R (46L). One end of a spring 59R (59L) engages the hook portion 56R (56L) while the other end of the spring 59R (59L) engages the bracket 58R (58L). The spring 59R (59L) is adapted to apply an urging force that rotates the release arm 46R (46L) in the counterclockwise direction in FIG. 3.

To ensure engagement between the lower arm 21R (21L) and the upper arm 22R (22L), a pressing bracket 26R (26L) is secured to the upper arm 22R (22L) and presses the circumferential portion of the lower arm 22R (22L). A spiral spring 27R (27L) is disposed between the bracket 26R and the bracket 58R (between the bracket 26L and the bracket 58L) for urging the upper arm 22R (22L) in the counterclockwise direction relative to the lower arm 21R (21L).

An arc-shaped cam slot 47R (47L) is formed in the release arm 46R (46L). The radius of curvature of the arc-shaped cam slot 47R (47L) coincides with the axis of the shaft 41R (41L). The pin 45R (45L) passes through the arc-shaped cam slot 47R (47L). The radially outwardly located portion of the inner periphery of the cam slot 47R (47L) constitutes a cam surface 48R (48L) having a profile that guides the pin 45R (45L) along the slot 38R (38L) toward the shaft 41R (41L) when the release arm 46R (46L) is rotated in the clockwise direction against the urging force of the spring 59R (59L).

Referring back to FIG. 1, toward the center of the seat 1, the release arm 46R (46L), the bracket 58R 58(L), the lower am 21R (21L), the cam lever 44R (44L), the upper arm 22R (22L), and a holder bracket 67R (67L) are assembled into a unit on the shaft 41R (41L) at the right side (left side) of the seat 1 in such a manner that the unit is held between a flange 55R (55L) and a snap ring 66R (66L). The flange 55R (55L) is formed at a larger diameter portion of the shaft 41R (41L) next to the release arm 46R (46L) while the snap ring 66R (66L) is fixedly engaged with an annular groove 63R (63L) formed in the outer surface of the shaft 41R (41L). The holder bracket 67R (67L) is secured, together with the lower arm 21R (21L), to the seat-cushion frame by way of the aforementioned bolts. At the side of the holder bracket 67R (67L), the shaft 41R (41L) is formed with a serration portion 54R (54L) which is made up of a plurality of parallel and spaced axial grooves.

Figure 4:
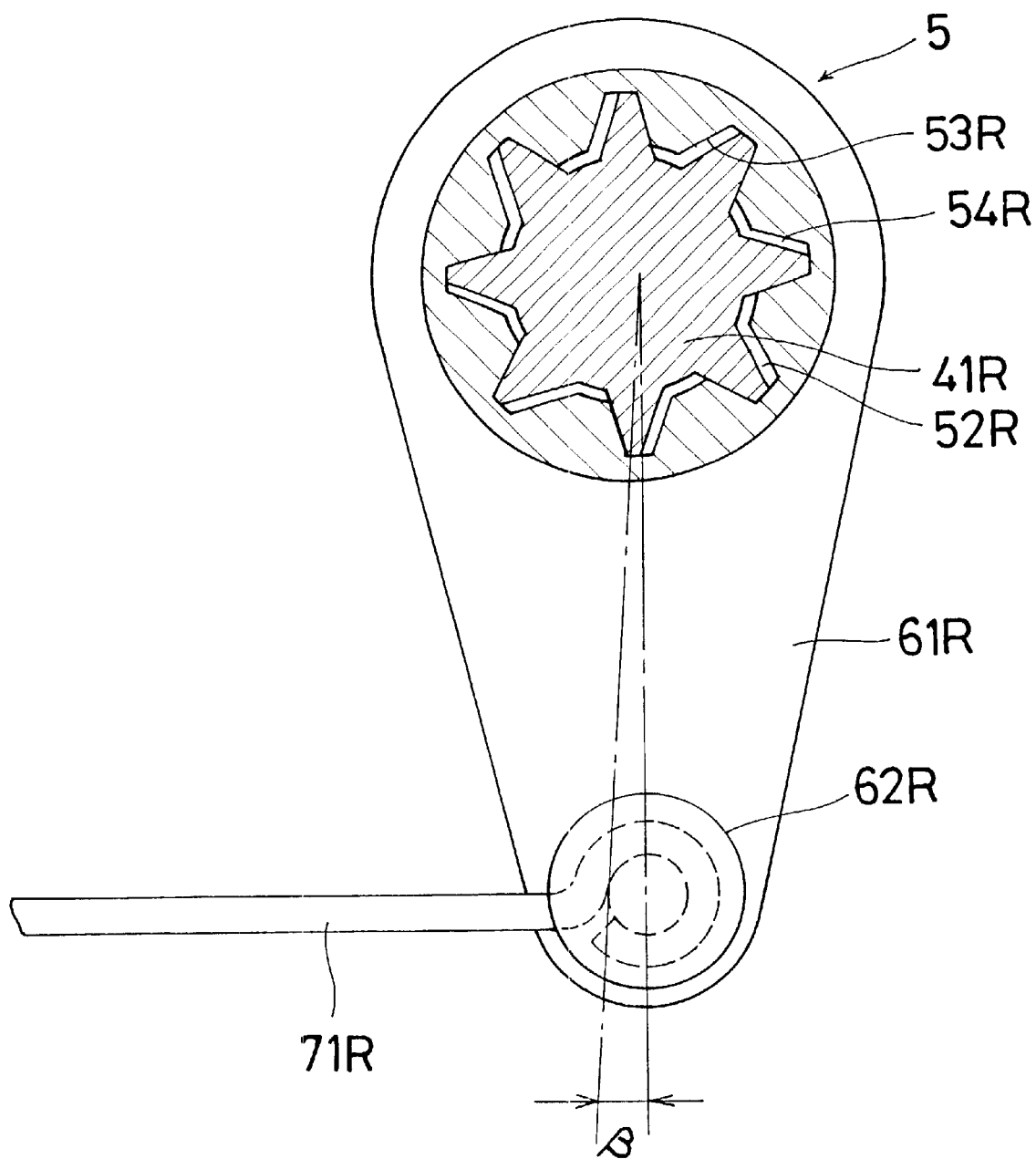
FIG. 4 is a cross-sectional view of the reclining angle adjustment system taken along the section line E—E in FIG. 1.

The connecting shaft 5 establishes cooperation or operative connection between the seat reclining devices 2R, 2L. The inner periphery at each end of the connecting shaft 5 is provided with serration portions 53R, 53L made up of a plurality of parallel and spaced axial grooves. The serration portions 53R on the inner surface of the shaft mesh with and engage the serration portion 54R of the shaft 41R, and the serration portions 53L on the inner surface at the opposite end of the shaft mesh with and engage the serration portion 54L of the shaft 41L. This thus provided a spline-type connection between the connecting shaft 5 and the shafts 41R. 41L. As best shown in FIG. 4, between the serration 53L and the serration 54L, a gap 52 is defined at each engagement for permitting mutual rotational play β.

The release arm 46R (46L) is urged by the spring 59R (59L) in the locking direction (i.e., the counterclockwise direction in FIG. 2) to ensure meshing engagement between the outer gear portion 36R (36L) of the pawl 43R (43L) and the inner gear portion 35R (35L) of the upper arm 22R (22L). To establish tighter meshing engagement between the gear portions 36R and 35R (36L and 35L), the pawl cam surface 37R (37L) possesses the tapered structure or configuration as mentioned above and this produces a stronger force toward the pawl 43R (43L).

A position C (FIG. 3) at which the release arm 46L stops varies within an angular range α. The release arm 46R stops at a similar position. In the seat reclining devices 2R, 2L which are connected by the shaft 5, irrespective of such variations, the release arms 46R, 46L has to stop within the aforementioned angular range α without being influenced by the other. To this end, the serration engagement between the shaft 41R (41L) and the shaft 5, the play β as seen in FIG. 4 is defined which is about one-half of α.

Arms 61R, 61L are secured on the opposite end portions of the connecting shaft 5 and extend in the lower direction. A pin 62R (62L) is fixed at the lower end of the arm 61R (61L), and the rear end of a connecting rod 71R (71L) shown in FIG. 4 is rotatably mounted on the pin 62R (62L). The connecting rod 71R (71L) extends towards the forward direction. The front end of the connecting rod 71R (71L) is rotatably held in a hole provided in an arm 72R (72L) of an operating lever 7R (7L) which is rotatably mounted to the seat cushion frame. Thus, when a knob 73R (73L) of the operating lever 7 is lifted, the resulting displacement of the connecting rod 71R (71L) causes the connecting shaft 5 to rotate.

Figure 3:
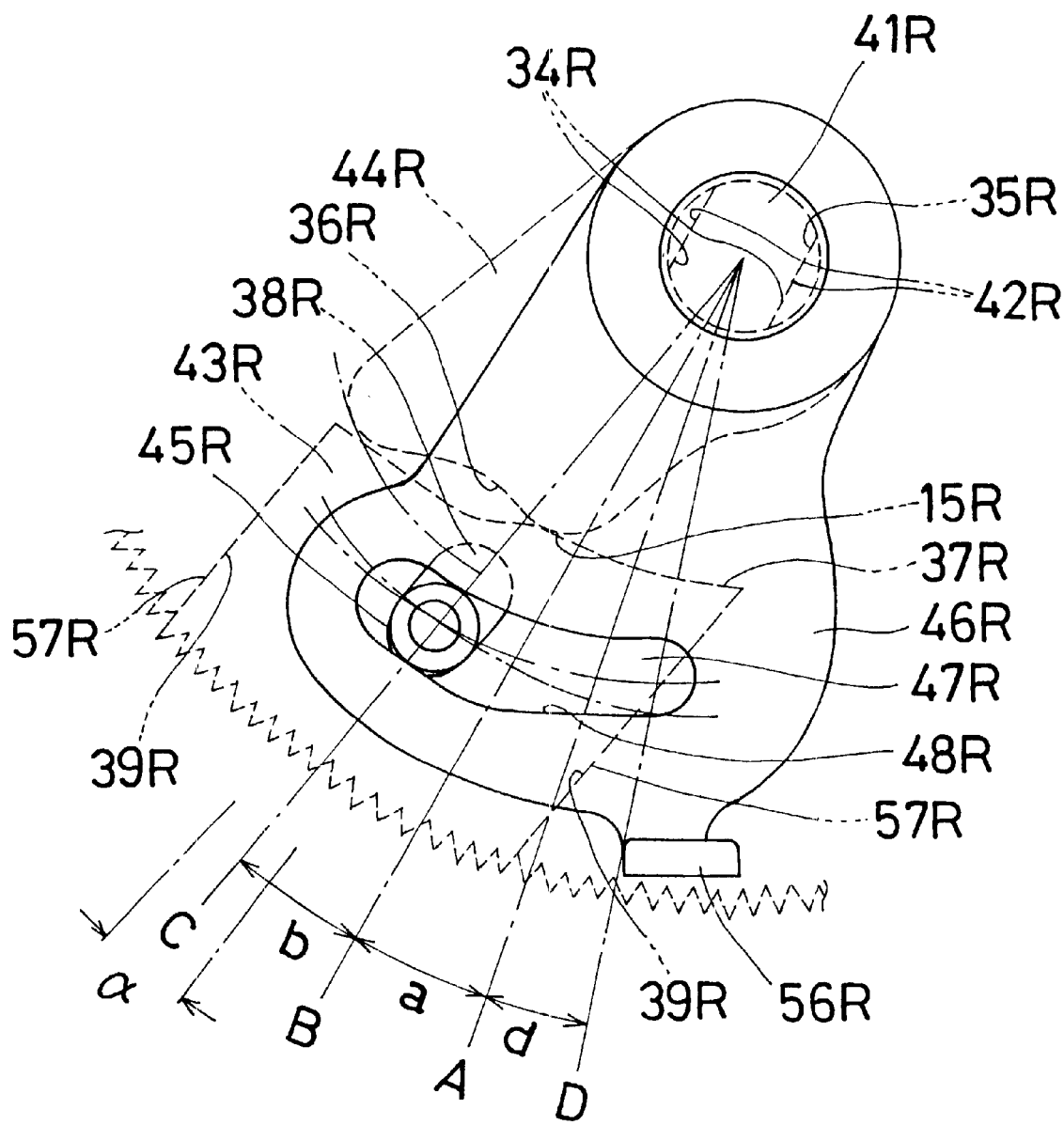
FIG. 3 is a side view of a portion of the reclining angle adjustment system shown In FIG. 1 explaining the structure and operation of the release arm.

In operation, when the operating lever 7R is manipulated, the connecting rod 71R is displaced or moved axially and the connecting shaft 5 is rotated. This causes the release arm 46R to rotate or move in the clockwise direction in FIG. 3. Simultaneously, the release arm 46L is rotated or moved in the same direction. In FIG. 3, at position C the outer gear portion of the pawl 43R is in tight meshing engagement with the inner gear portion of the upper arm 22R, at position B the engagement between the outer gear portion of the pawl 43R and the inner gear portion of the upper arm 22R begins to release, and at position A the engagement between the outer gear portion of the pawl 43R and the inner gear portion of the upper arm 22R is completely released. The rotation or movement of the pin 45R of the release arm 46R begins at position A and terminates in position C after passing through position B. The release arm 46R is able to rotate further and thus the pin 45R can be rotated or moved relative to the cam slot 47R to a position D. While the release arm 46R rotates between positions A and D, the upper arm 22R becomes rotatable relative to the lower arm 21R. Similarly, the upper arm 22L becomes rotatable relative to the lower arm 21L.

Thus, it becomes possible to adjust the reclining angle of the seat-back 12 relative to the seat-cushion 13. The seat reclining device 2L and its lock mechanism are symmetrical with the seat reclining device 2R and its lock mechanism in the vehicle lateral direction, i.e., a bilateral structural arrangement is constructed between the seat reclining device 2L with its lock mechanism and the seat reclining device 2R with its lock mechanism. This makes it possible to release the seat reclining devices 2R, 2L simultaneously in an accurate manner when either of the operating levers 7R, 7L is manipulated.

In addition, the rotational angle or play angle β between the serrations/grooves of the shaft 41R (41L) and the connecting shaft 5 ensures an accurate independent locking operation of the seat reclining device 2R (2L).

As apparent from the foregoing descriptions, the present invention makes it possible to connect the operating levers 7R, 7L to the connecting shaft 5 in a direct fashion, thus making it possible to extend or enlarge the design flexibility.

In accordance with the present invention, in a reclining angle adjustment system including a pair of seat reclining devices provided at opposite sides of a seat and a connecting shaft connecting the seat reclining devices for cooperative operation, it becomes possible to manipulate the reclining angle adjustment system at either side of the seat.

In addition, the operating lever can be provided at either one of the vehicular lateral opposite sides without changing the structure of the operating lever.

The principles, preferred embodiment and mode of operation of the present invention have been described in the foregoing specification. However, the invention which is intended to be protected is not to be construed as limited to the particular embodiment disclosed. Further, the embodiment described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A seat reclining angle adjustment device comprising:

a pair of seat reclining devices provided at laterally opposite sides of a seat device having a seat cushion member and a seat back member, each of the seat reclining devices having a lock mechanism which locks the seat back member in position relative to the seat cushion member and upon release allows the seat back member to be tilted in different angular positions with respect to the seat cushion member, the lock mechanisms being symmetrical with respect to one another;

a connecting shaft interconnecting the lock mechanisms of the respective seat reclining devices in a mutually operative manner;

operating means connected directly to the connecting shaft for rotating the connecting shaft, wherein rotation of the connecting shaft is transmitted from the connecting shaft to both of the lock mechanisms; and wherein the operating means transmits an operating force to the connecting shaft by way of a transmission member.

2. A seat reclining angle adjustment device comprising:

a pair of seat reclining devices provided at laterally opposite sides of a seat device having a seat cushion member and a seat back member, each of the seat reclining devices having a lock mechanism which locks the seat back member in position relative to the seat cushion member and upon release allows the seat back member to be tilted in different angular positions with respect to the seat cushion member, the lock mechanisms being symmetrical with respect to one another;

a connecting shaft interconnecting the lock mechanisms of the respective seat reclining devices in a mutually operative manner;

operating means connected directly to the connecting shaft for rotating the connecting shaft, wherein rotation of the connecting shaft is transmitted from the connecting shaft to both of the lock mechanisms; and wherein the operating means includes an operating lever that is connected to the connecting shaft by way of an arm fixed to the connecting shaft and a connecting rod operatively connected to the operating lever and the arm.

3. The seat reclining angle adjustment device as set forth in claim 2, wherein the operating means includes a pair of operating levers each operatively connected to the connecting shaft.

4. The seat reclining angle adjustment device as set forth in claim 1, wherein the operating means includes a pair of operating levers each operatively connected to the connecting shaft.

5. A seat reclining angle adjustment device comprising:

a pair of seat reclining devices provided at laterally opposite sides of a seat device having a seat cushion member and a seat back member, each of the seat reclining devices having a lock mechanism which locks the seat back member in position relative to the seat cushion member and upon release allows the seat back member to be tilted in different angular positions with respect to the seat cushion member, the lock mechanisms being symmetrical with respect to one another;

a connecting shaft interconnecting the lock mechanisms of the respective seat reclining devices in a mutually operative manner;

operating means connected directly to the connecting shaft for rotating the connecting shaft, wherein rotation of the connecting shaft is transmitted from the connecting shaft to both of the lock mechanisms; and wherein each seat reclining device includes an upper arm connected to the seat back member and a lower arm connected to the seat cushion member, the upper and lower arms of each seat reclining device being rotatably mounted on a shaft member, the shaft member of each seat reclining device being connected to the connecting shaft with a predetermined angle of play therebetween for enabling each lock mechanism to be locked without being influenced by the other lock mechanism.

6. The seat reclining angle adjustment device as set forth in claim 5, wherein the shaft member of each seat reclining device is connected to the connecting shaft by way of engaging portions on the connecting shaft and engaging portions on the shaft members that together form a spline connection.

7. A seat reclining angle adjustment device comprising:

a pair of seat reclining devices provided at laterally opposite sides of a seat having a seat cushion member and a seat back member, each of the seat reclining devices including a lock mechanism which locks the seat back member in position relative to the seat cushion member and upon release allows the seat back member to be tilted in different angular positions with respect to the seat cushion member, the lock mechanisms being symmetrical with respect to one another;

a connecting shaft interconnecting the lock mechanisms of the respective seat reclining devices in a mutually operative manner;

a pair of manually engageable operating levers positioned at respective sides of the seat;

a pair of connecting rods each having a first end connected to a respective portion of the connecting shaft and a second end connected to a respective one of the operating levers for transmitting operating movement of either one of the operating levers directly to the connecting shaft, whereupon the connecting shaft transmits the operating movement to both of the lock mechanisms to effect a release of the locking mechanisms of both seat reclining devices.

8. The seat reclining angle adjustment device as set forth in claim 7, including a pair of arms fixed to the connecting shaft, each arm being connected to one of the connecting rods.

9. The seat reclining angle adjustment device as set forth in claim 7, wherein each seat reclining device includes an upper arm connected to the seat back member and a lower arm connected to the seat cushion member, the upper and lower arms of each seat reclining device being rotatably mounted on a shaft member, the shaft member of each seat reclining device being connected to the connecting shaft with a predetermined angle of play therebetween for enabling each lock mechanism to be locked without being influenced by the other lock mechanism.

10. The seat reclining angle adjustment device as set forth in claim 9, wherein the shaft member of each seat reclining device is connected to the connecting shaft by way of engaging portions on the connecting shaft and engaging portions on the shaft members that together form a spline connection.

11. A vehicle seat reclining angle adjustment device comprising:

a pair of seat reclining devices provided at laterally opposite sides of a seat having a seat cushion member and a seat back member, each of the seat reclining devices including an upper arm adapted to be connected to the seat back member, a lower arm adapted to be connected to the seat cushion member, a shaft member on which the upper and lower arms are rotatably supported and a lock mechanism which locks the upper and lower arms in position relative to each other and upon release allows the upper arm to be tilted in different angular positions with respect to the seat cushion member, the lock mechanisms being symmetrical with respect to one another;

a rotatable connecting shaft connected to each of the shaft members by engaging elements provided on both the connecting shaft and the shaft members so that rotation of the connecting shaft causes rotation of the shaft members to effect release of the lock mechanisms with a predetermined angle of play between the lock mechanisms to allow each lock mechanism to be locked without being influenced by the other lock mechanism; and a manually engageable operating lever positioned at least at one side of the seat and operatively connected to the connecting shaft so that operation of the operating lever causes rotation of the connecting shaft which in turn causes rotation of the shaft members to effect release of both of the lock mechanisms.

12. The vehicle seat reclining angle adjustment device as set forth in claim 11, wherein the operating lever transmits an operating force to the connecting shaft by way of a transmission member.

13. The vehicle seat reclining angle adjustment device as set forth in claim 12, wherein the transmission member includes a connecting rod that is connected to an arm fixed to the connecting shaft.

14. The vehicle seat reclining angle adjustment device as set forth in claim 11, including a pair of operating levers each operatively connected to the connecting shaft.

15. The vehicle seat reclining angle adjustment device as set forth in claim 11, wherein the shaft member of each seat reclining device is connected to the connecting shaft by way of engaging portions on the connecting shaft and engaging portions on the shaft members that together form a spline connection.

16. The seat reclining angle adjustment device as set forth in claim 5, wherein the operating means includes a pair of operating levers each operatively connected to the connecting shaft.

* * * * *